United States Patent
Fathimulla et al.

[11] Patent Number: 6,121,709
[45] Date of Patent: *Sep. 19, 2000

[54] ROTOR ASSEMBLY HAVING BONDED LAMINATION STACK

[75] Inventors: Ayub Fathimulla, Ellicott City, Md.; M. N. Menon, Tempe; Walter Lee Meacham, Phoenix, both of Ariz.

[73] Assignee: AlliedSignal Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/951,600

[22] Filed: Oct. 16, 1997

[51] Int. Cl.[7] .................. H02K 1/00; H02K 1/22
[52] U.S. Cl. .................. 310/216; 310/216; 310/45
[58] Field of Search .................. 310/261, 117, 310/58, 60 R, 61, 264, 258, 45, 217, 218, 43; 29/596, 598

[56] References Cited

U.S. PATENT DOCUMENTS

| | | | |
|---|---|---|---|
| 3,802,068 | 4/1974 | Scott | 29/598 |
| 3,803,431 | 4/1974 | Inaba et al. | 310/49 R |
| 3,840,983 | 10/1974 | Ryff | 29/598 |
| 4,110,644 | 8/1978 | Roddy | 310/91 |
| 4,197,975 | 4/1980 | Williamson | 228/48 |
| 4,255,494 | 3/1981 | Reen et al. | 428/551 |
| 4,263,711 | 4/1981 | Sakano et al. | 29/597 |
| 4,489,249 | 12/1984 | Olivier | 310/216 |
| 4,499,660 | 2/1985 | Lenz | 29/598 |
| 4,912,350 | 3/1990 | Parshall et al. | 310/59 |
| 4,970,424 | 11/1990 | Nakamura et al. | 310/51 |
| 5,075,585 | 12/1991 | Teruyama et al. | 310/89 |
| 5,200,662 | 4/1993 | Tagami et al. | 310/261 |
| 5,477,092 | 12/1995 | Tarrant | 310/43 |
| 5,534,736 | 7/1996 | Johnson | 310/91 |
| 5,563,463 | 10/1996 | Stark | 310/156 |
| 5,608,370 | 3/1997 | Jang | 336/120 |
| 5,760,520 | 6/1998 | Hasebe et al. | 310/261 |

*Primary Examiner*—Nestor Ramirez
*Assistant Examiner*—Tran N. Nguyen
*Attorney, Agent, or Firm*—William J. Zak, Jr.

[57] ABSTRACT

A rotor assembly includes a stack of laminations that are bonded together by a dielectric bonding agent. The laminations and the dielectric bonding agent have matching coefficients of thermal expansion.

16 Claims, 4 Drawing Sheets

ROTOR ASSEMBLY HAVING BONDED LAMINATION STACK

BACKGROUND OF THE INVENTION

The invention relates generally to electrical machines. More particularly, the invention relates to a laminated rotor assembly for an electrical machine.

A typical design approach for a laminated rotor assembly includes shrink fitting a stack of laminations onto a shaft. The resulting shrink fit is used to transmit toque from the shaft to the laminations. Only the shaft provides stiffness and support for the laminations. Due to material limitations and shaft stiffness requirements, however, this approach results in a rotor assembly having a low tip speed, low relative stiffness and, consequently, poor dynamic performance.

Dynamic performance can be improved by increasing the stiffness of the lamination stack. Increasing the stiffness decreases the amount of deflection during operation at high rotational speeds and/or high operating temperatures.

Stiffness can be increased by clamping the lamination stack with a central tieshaft. Higher clamping loads result in higher stiffness. However, the higher clamping loads also decrease efficiency of the electrical machine. Magnetic insulation layers are not well maintained under high clamping loads, and core losses are increased. Moreover, the tieshaft interferes with the cooling of the lamination stack.

SUMMARY OF THE INVENTION

A rotor assembly of an electrical machine comprises a stack of laminations and a dielectric bonding agent. The laminations are bonded together by the dielectric bonding agent. The laminations and the dielectric bonding agent have matching coefficients of thermal expansion.

DETAILED DESCRIPTION OF THE INVENTION

Figure 1:
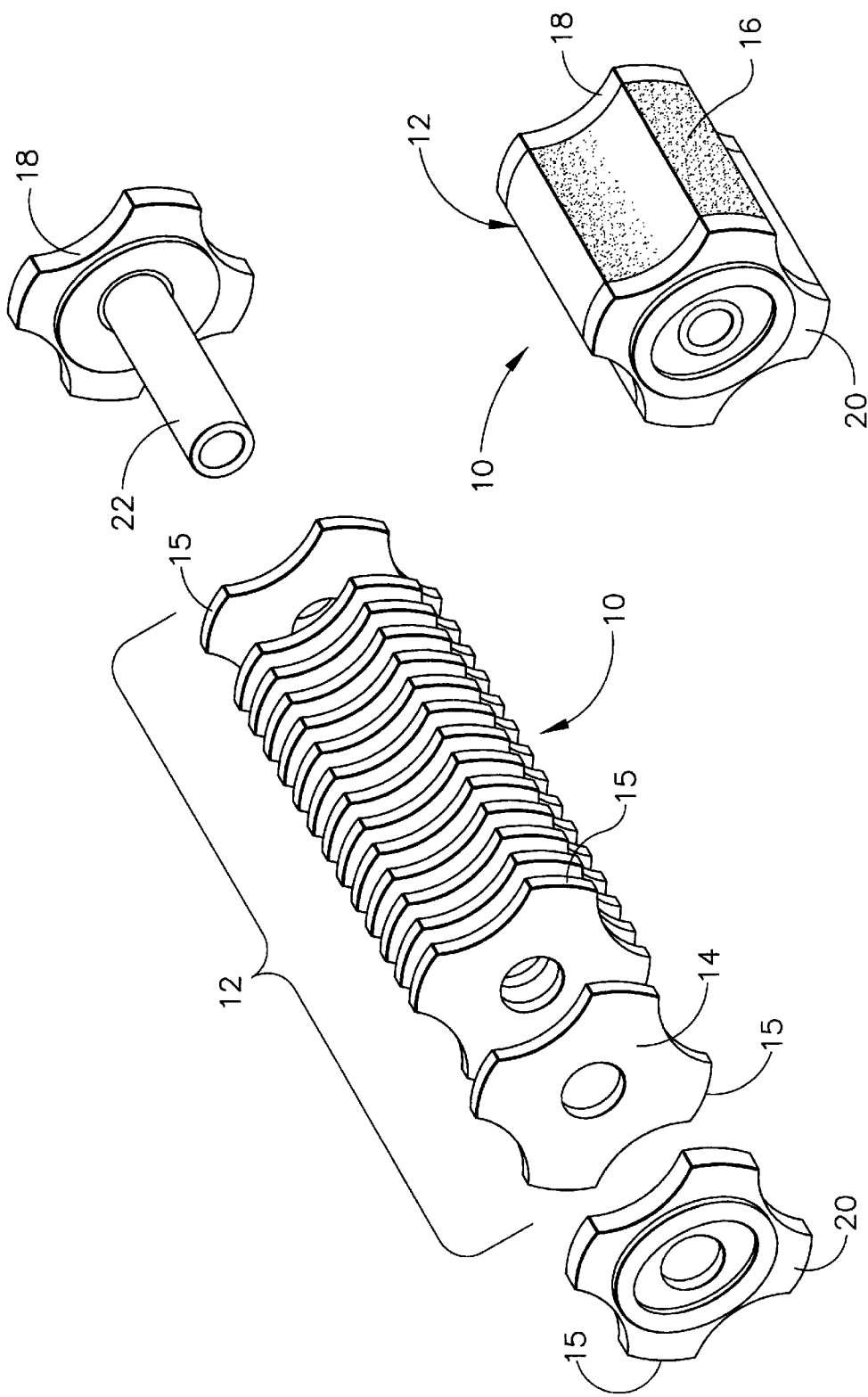
FIG. 1a is an exploded perspective view of a rotor assembly according to the present invention.
FIG. 1b is a perspective view of the rotor assembly after bonding.

FIGS. 1a and 1b show a rotor assembly 10 including a stack 12 of laminations 14. The laminations 14 can be made of a soft magnetic material such as iron—cobalt or silicon steel. The laminations 14 shown in FIGS. 1a and 1b are configured for a switched reluctance machine. However, the laminations 14 could be configured for other types of electrical machines, such as inductance machines and wound rotor machines. The laminations 14 are bonded together by a dielectric bonding agent 16.

The dielectric bonding agent 16 is made of a non-magnetic insulator material. The laminations 14 and the dielectric bonding agent 16 have matching coefficients of thermal expansion. Dielectric bonding agents 16 can include, but are not limited to, spin-on-glass (doped or undoped), probomide, polyimide, organic-based ceramic compounds and sol-gels. Dielectric bonding agents 16 can also include organic-based metallic-oxide compounds such as a titanium oxide ($TiO_2$), aluminum oxide ($Al_2O_3$) and silicon nitride ($Si_3N_4$). The dielectric bonding agent 16 can even be a material having a low dielectric constant (K) such as "Teflon" (K=~2.3). Selection of the dielectric bonding agent 16 depends upon factors such as ability to bond to the surface of the laminations 14, the coefficient of thermal expansion of the lamination material, and operating temperature of the rotor assembly 10. The dielectric bonding agents 16 listed above can be used for laminations made of iron—cobalt and silicon steel at operating temperatures of up to 1000° F.

Thickness and surface finish of the layers of bonding agent 16 between the laminations 14 are dependent upon the application for which the rotor assembly 10 is intended. Thick layers having coarse finishes generally adhere better to the laminations 14 than thin, polished layers. Moreover, thicker layers offer better magnetic insulation. However, rotor assemblies having thin, polished layers have better stacking factors than rotor assemblies having thick, coarse layers. The rotor assemblies having better stacking factors can also have larger diameters and, therefore, larger tip speeds. Resulting is a tradeoff: bonding strength and magnetic insulation versus stacking factor and size of the rotor assembly.

The rotor assembly 10 further includes first and second end caps 18 and 20 that are bonded to opposite ends of the lamination stack 12 by the dielectric bonding agent 16. The end caps 18 and 20 are made of a non-magnetic material. A shaft 22 extends though a central bore of the lamination stack 12. The lamination stack 12 is secured to the shaft 22 by an interference fit. In the alternative, the shaft 22 can be bonded to the lamination stack 12 by the bonding agent 16 while the laminations 14 are being bonded together. Each lamination 14 and end caps 18 and 20 have four poles 15.

Figure 2:
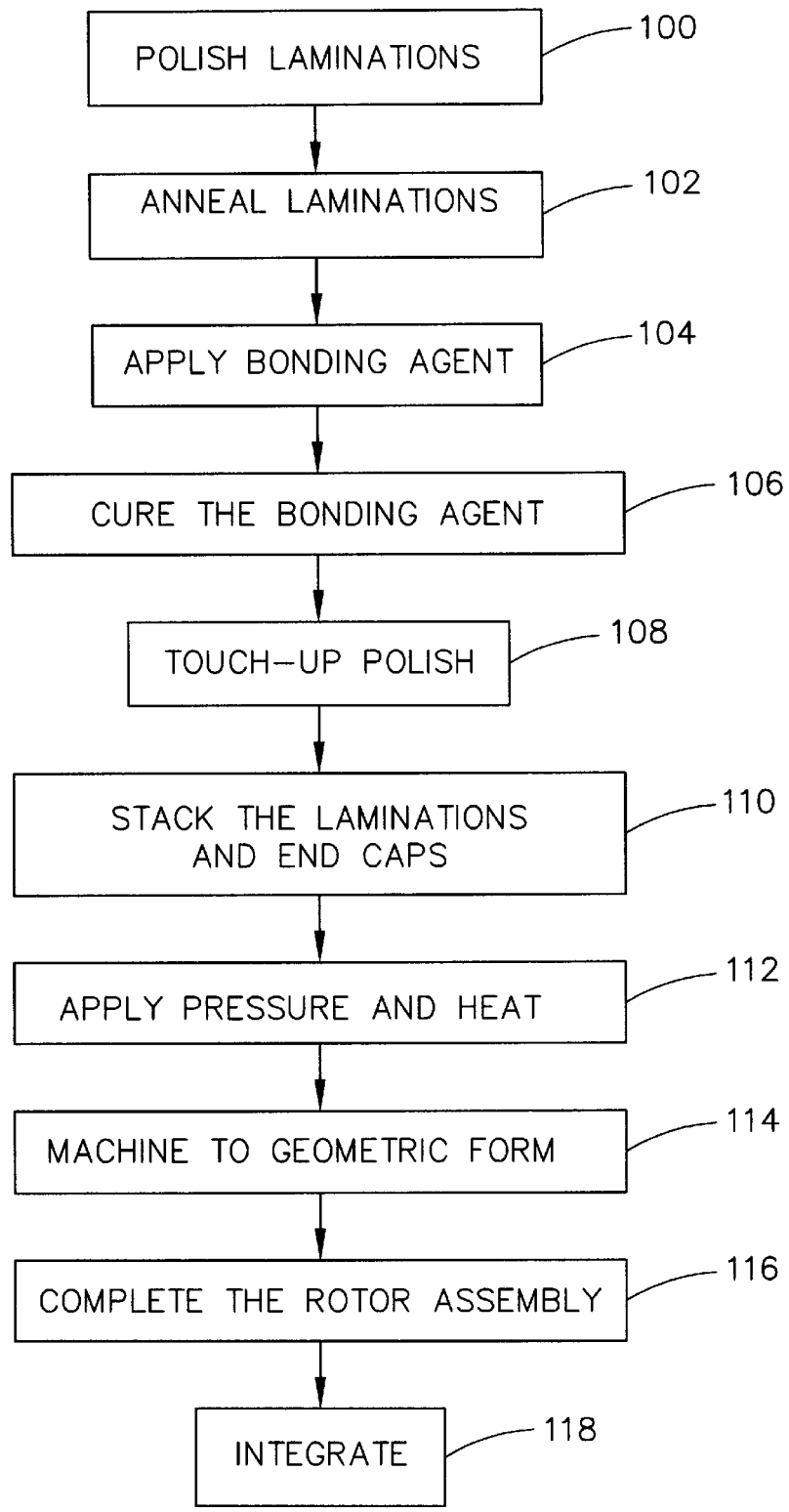
FIG. 2 is a flowchart of a method of fabricating the rotor assembly.

FIG. 2 shows the steps for fabricating the rotor assembly 10. The laminations are polished to remove rough surfaces (step 100). After the surfaces are polished, the laminations 14 are annealed (step 102). Annealing improves the mechanical and magnetic properties of the laminations 14. Next, the bonding agent 16 is applied (step 104). The entire surfaces, (i.e. the radial and axial facing surfaces), of the laminations 14 are covered with the dielectric bonding agent 16, and end cap surfaces that come into contact with the lamination stack 12 are also covered with the dielectric bonding agent 16. Layers of the dielectric bonding agent 16 can be applied to the laminations 14 and end caps 16 and 18 by a process such as spin-coating, spraying, rolling and/or dipping.

After the bonding agent 16 is applied, it is cured (step 106). Curing drives out organic solvents in the bonding agent 16.

If necessary, the layers of the dielectric bonding agent 16 are polished (step 108). Applying the bonding agent 16 by a process such as spin coating might cause a buildup around the edges of the laminations 14. Polishing would remove the buildup. A process such as dip coating, however, might not cause a buildup and, therefore, might not have to be followed by polishing.

Next, the laminations 14 and the end caps 16 and 18 are stacked (step 110). Bringing the laminations 14 into contact causes a moderately strong bond to be formed between the laminations 14.

Bond strength is increased greatly by applying a pressure load to the laminations 14 during a predefined thermal cycle (step 112). During the thermal cycle, temperature is raised from room temperature to a curing temperature. After the bonding agent has been allowed to cure, the temperature is lowered and the pressure load is removed. Here too, a tradeoff is involved. Lower temperatures over longer curing periods generally result in higher strength and better insulation properties. Thus, the tradeoff is manufacturing speed versus mechanical and insulation properties. Still, higher temperatures over shorter curing periods could still provide a lamination stack 12 having adequate strength and magnetic insulation.

By way of example, laminations 14 made of an iron—cobalt alloy are bonded with probomide. The probomide is spin-coated onto the laminations 14 to a thickness of approximately five microns, the laminations 14 are stacked, and a pressure load of six tons on a six inch plate is applied to the stack 12 for two to twenty four hours at a temperature between 200° C. and 300° C.

The lamination stack 12 is then machined to geometric form (step 114). Machining after stacking and bonding is far simpler than the conventional process of precutting geometric figures and then stacking.

The rotor assembly 10 is then completed (step 116). If the shaft 22 has not already been bonded to the lamination stack 12, the bonded lamination stack 12 is secured to the shaft 22 by an interference fit. The rotor assembly 10 can be journalled by bearings, balanced by adding or removing balance material, and checked and corrected for runout. Detailing the rotor assembly 10 can be done more easily and less expensively after assembly than detailing a conventional rotor during various phases of assembly. Detailing after assembly allows for better quality control of the rotor assembly 10.

Piloting features can be added to the rotor assembly 10. The end caps 18 and 20 can be provided with piloting features that engage piloting features of other components of a turbomachine. The piloting features can include curvex, axial face and radial diameter, or other such features.

Resulting is a component that can be integrated into an electrical machine or the rotating group of a turbomachine (step 118). The rotor assembly 10 can be used as a starter/generator capable of high-speed and high-temperature operation in a turbomachine such as an Auxiliary Power Unit (APU) or an Integrated Power Unit (IPU). However, usage of the rotor assembly 10 is not limited to such turbomachines. The rotor assembly 10 can also be used in small, low-speed, low-temperature motors for products such as household appliances.

Figure 3:
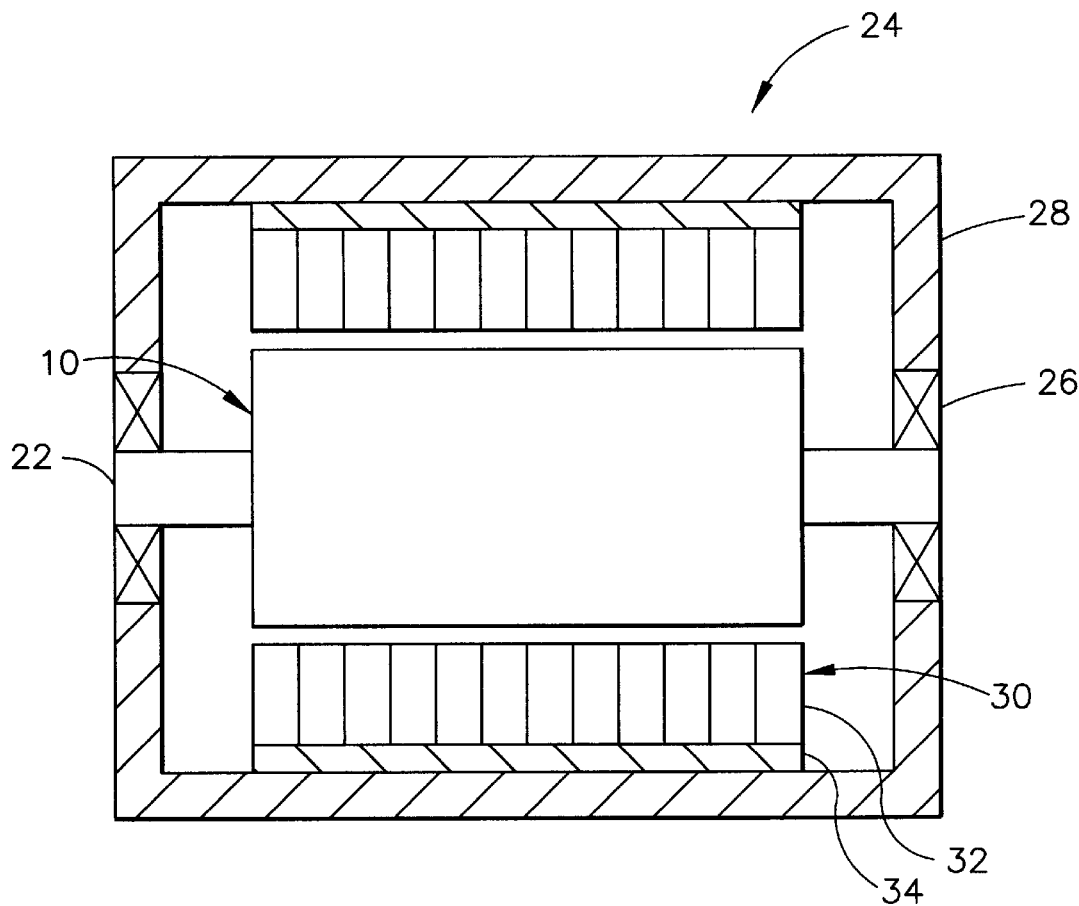
FIG. 3 is a schematic diagram of an electrical machine including the rotor assembly.
Figure 4:
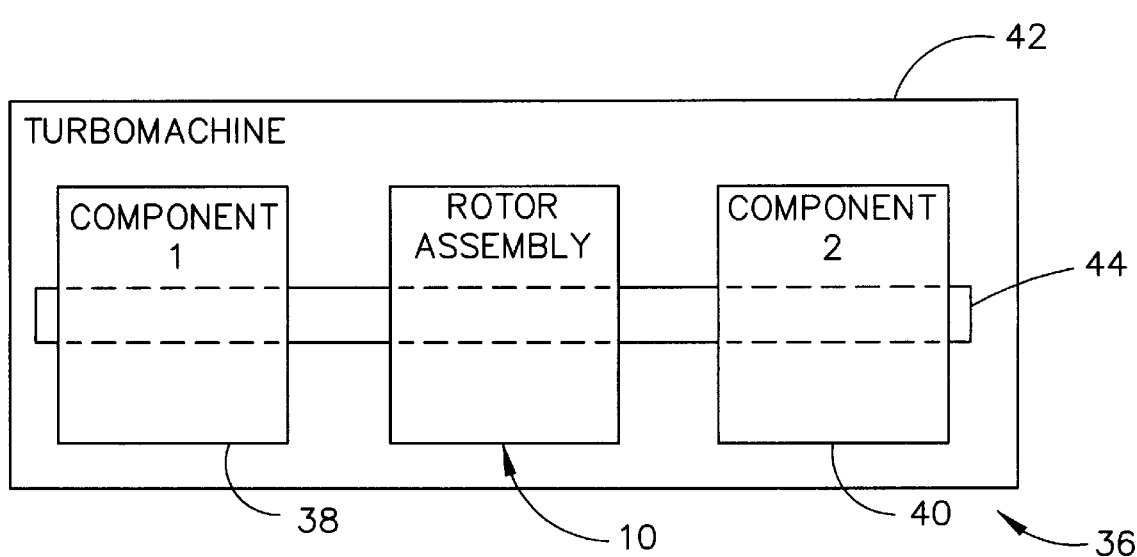
FIG. 4 is a block diagram of a turbomachine including the rotor assembly.
Figure 5:
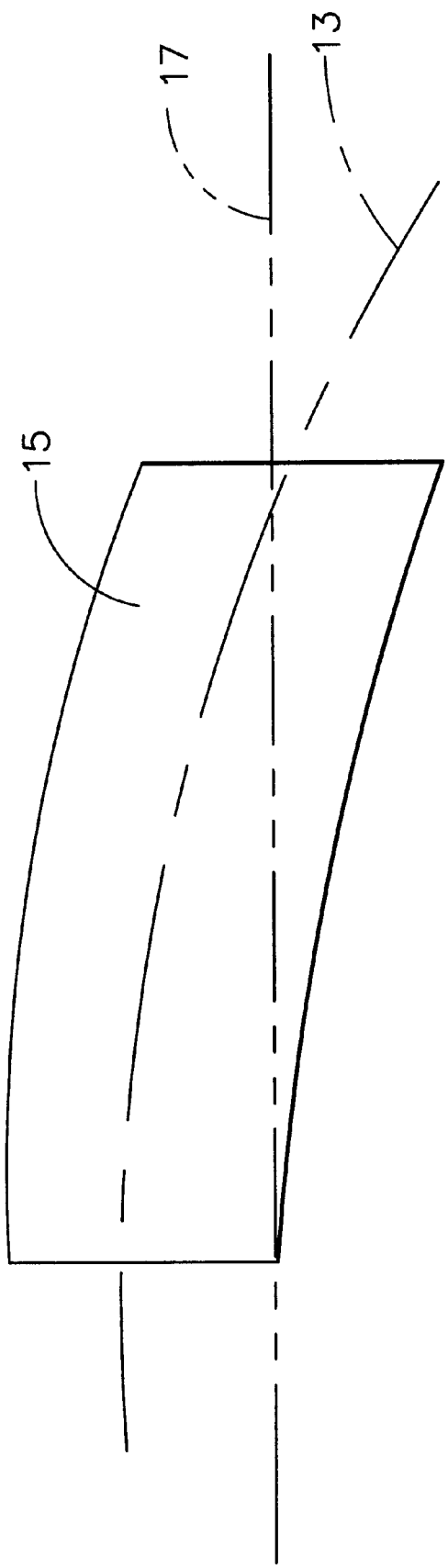
FIG. 5 is a schematical top view of an offset rotor assembly according to the present invention.

FIG. 3 shows a rotor assembly 10 that is integrated into an electrical machine 24. The rotor assembly 10 is supported by bearings 26 within a housing 28. A stator assembly 30 is mounted to the housing 28. The stator assembly 30 includes a stack 32 of laminations surrounding the rotor assembly 10 and a retainer sleeve 34 surrounding the lamination stack 32. The retainer sleeve 34 and the laminations of the stack 32 can be bonded together as described above. PATENT FIG. 4 shows a rotor assembly 10 that is integrated into the rotating group of a turbomachine 36. The rotating group also includes a first component 38 such as a turbine wheel assembly, a second component 40 such as a compressor wheel assembly, and a housing 42. The rotor assembly 10 and the first and second components 38 and 40 are stacked together, with piloting features on the end caps 18 and 20 of the rotor assembly 10 mating with piloting features on the first and second components 38 and 40. The rotor assembly 10 and the first and second components 38 and 40 are secured together by a group tieshaft 44.

Thus disclosed is a laminated rotor assembly 10 that achieves high stiffness by bonding instead of clamping. Bonding instead of clamping reduces core and insulation losses. Bonding instead of clamping also eliminates the tieshaft. Eliminating the tieshaft increases cooling efficiency and reduces overall length of the electrical machine.

Bonding also eliminates the need for a pilot shaft. This, in turn, further increases cooling efficiency, since a cooling fluid can be brought into direct contact with the laminations 14.

The bonded laminations 14 also offer superior mechanical and dynamic characteristics over unbonded, unclamped laminations. Bonded laminations 14 have higher stiffness, which reduces rotor deflections. Bonded laminations 14 are less likely to shift and produce vibrations that could damage the electrical machine. Additionally, bonding allows some of the poles of the laminations to be offset. Offsetting some of the poles allows to cooling flow to be optimized along the poles and windage losses to be minimized.

Bonding also improves the manufacturability and reliability of the rotor assembly 10. As with glue, the dielectric bonding agent 16 makes it easier to assemble loose laminations. Unlike glue, the dielectric bonding agent 16 contributes to the strength and stiffness of the laminations 14. Additionally, the dielectric bonding agent 16 does not have the inherent temperature limitations of glue. Whereas the glue limits a rotor assembly to low temperature operation, the dielectric bonding agent 16 allows the rotor assembly 10 to run at high operating temperatures.

We claim:

1. A rotor assembly for an electrical machine, the rotor assembly comprising:
   a stack of laminations, each lamination formed from a soft magnetic material;
   a dielectric bonding agent disposed over substantially the entire radial and axial facing surfaces of each of said laminations, the laminations being bonded together by the dielectric bonding agent, the laminations and the dielectric bonding agent having matching coefficients of thermal expansion, said bonding agent providing magnetic insulation between said bonded laminations;
   first and second end caps bonded to said laminations by said dielectric bonding agent; and
   a shaft bonded by said dielectric bonding agent to a bore defined by said laminations.

2. The rotor assembly of claim 1, wherein the dielectric bonding agent is taken from the group of spin-on-glasses, probomides, polyimides, organic-based metallic-oxide compounds, organic-based ceramic compounds, and sol-gels.

3. The rotor assembly of claim 1, wherein the dielectric bonding agent is a spin-on-glass.

4. The rotor assembly of claim 1, wherein the dielectric bonding agent is a probomide.

5. The rotor assembly of claim 1, wherein the dielectric bonding agent is a polyimide.

6. The rotor assembly of claim 1, wherein the dielectric bonding agent is an organic-based metallic-oxide compound.

7. The rotor assembly of claim 1, wherein the dielectric bonding agent is a dielectric material having a low dielectric constant.

8. The rotor assembly of claim 1, wherein the dielectric bonding agent is an organic-based ceramic compound.

9. The rotor assembly of claim 1, wherein the dielectric bonding agent is a sol-gel.

10. The rotor assembly of claim 1 wherein said soft magnetic material is iron—cobalt.

11. The rotor assembly of claim 1 wherein said soft magnetic material is silicon steel.

12. An electrical machine comprising:

a housing;

a stator assembly mounted to the housing;

a rotor assembly including a shaft, a stack of laminations mounted to said shaft, each lamination formed from a soft magnetic material; and a dielectric bonding agent disposed over substantially the entire radial and axial facing surfaces of each of said laminations, the laminations being bonded together by the dielectric bonding agent, the laminations and the dielectric bonding agent having matching coefficients of thermal expansion, the shaft being bonded to the stack of laminations by said dielectric bonding agent;

said bonding agent providing magnetic insulation between said laminations;

first and second end caps bonded to said laminations by said dielectric bonding agent; and a plurality of bearings for supporting the rotor assembly within the housing.

13. The machine of claim 12, wherein the dielectric bonding agent is taken from the group of spin-on-glasses, probomides, polyimides, organic-based metallic-oxide compounds, organic-based ceramic compounds, and sol-gels.

14. The machine of claim 12, wherein the dielectric bonding agent is a dielectric material having a low dielectric constant.

15. The rotor assembly of claim 12 wherein said soft magnetic material is iron—cobalt.

16. The rotor assembly of claim 12 wherein said soft magnetic material is silicon steel.

* * * * *